UNITED STATES PATENT OFFICE.

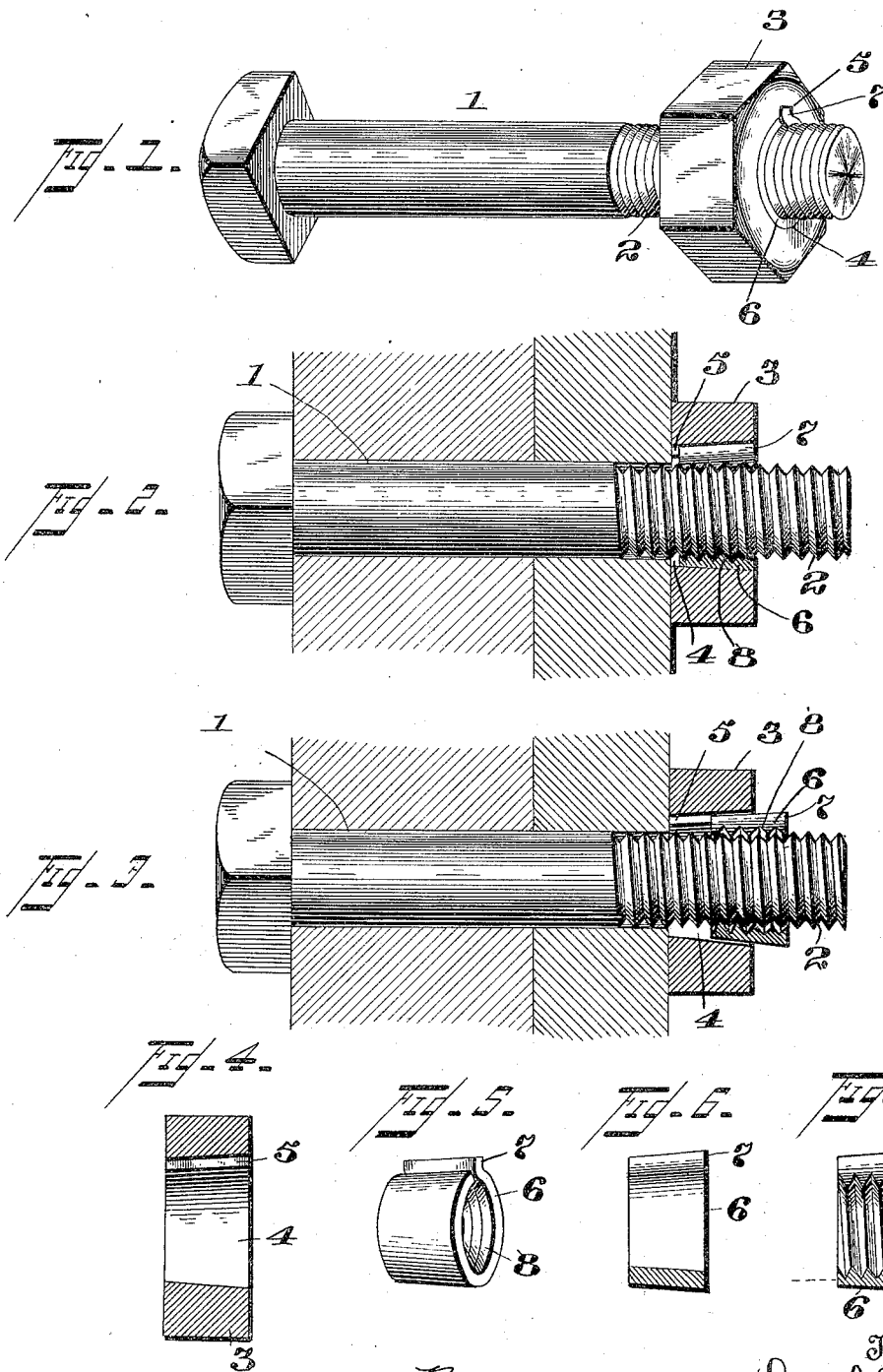

DANIEL RHODES, OF WASHINGTON, DISTRICT OF COLUMBIA.

NUT-LOCK.

SPECIFICATION forming part of Letters Patent No. 643,364, dated February 13, 1900.

Application filed May 13, 1899. Serial No. 716,712. (No model.)

*To all whom it may concern:*

Be it known that I, DANIEL RHODES, a citizen of the United States, residing at Washington, in the District of Columbia, have invented a new and useful Nut-Lock, of which the following is a specification.

This invention relates to nut-locks, and particularly to that type of nut-locks in which the nut proper is made of separable parts or members which when the nut is screwed home coöperate and provide means for tightly gripping the threads of the bolt with which it is used, so as to prevent its working loose by reason of the vibration to which it may be subjected.

To this end the invention primarily contemplates an improved construction of a lock-nut having a separate locking-bushing which may be constructed with great facility and which will be more positive and reliable in its action than the nut-bushing covered by my former patent, No. 530,963, issued December 18, 1894.

A further object of the invention is to provide an improved form of locking-bushing for a nut whereby such bushing may be struck up from a strip of sheet metal of the same thickness throughout, thereby securing the benefit of the full strength of the metal, while at the same time greatly facilitating the manufacture of the bushing.

With these and other objects in view, which will more readily appear as the nature of the invention is better understood, the same consists of the novel construction, combination, and arrangement of parts hereinafter more fully described, illustrated, and claimed.

While the fundamental features of the invention may be susceptible to modification without departing from the spirit or scope thereof, still the preferred embodiment of the improvements is shown in the accompanying drawings, in which—

Figure 1 is a perspective view of a nut-lock shown applied to a bolt and constructed in accordance with the present invention. Fig. 2 is a sectional view of the lock, showing the parts in their locked positions. Fig. 3 is a view similar to Fig. 2, showing the nut against the abutment, with the locking-bushing in position for being drawn into the nut by the rotation of the latter. Fig. 4 is a detail sectional view of the nut with the bushing removed therefrom. Fig. 5 is a detail in perspective of the bushing. Fig. 6 is a detail sectional view of the bushing, showing the same prior to tapping. Fig. 7 is a view similar to Fig. 6, showing the bushing tapped.

Like numerals of reference designate corresponding parts in the several figures of the drawings.

In the accompanying drawings the numeral 1 designates a bolt of the usual construction, such as is ordinarily employed in connection with rail-joints or other objects, and the threaded portion 2 of the bolt is designed to receive thereon a nut 3. The nut 3 is of the ordinary polygonal shape to facilitate the application of a wrench thereto, and in carrying out the present invention the said nut is provided with a threadless tapered bore 4, having in the wall thereof a transverse groove 5, extending through the nut from side to side thereof.

The tapered bore 4 of the nut 3 flares toward the outer side of the nut and is adapted to receive therein the frusto-conical resilient locking-bushing 6. This resilient locking-bushing 6 is struck up from a strip of sheet metal of the same thickness throughout in contradistinction from the construction shown in my former patent, in which the strip of sheet metal from which the bushing is formed tapers in thickness from edge to edge thereof. By means of suitable dies or formers the strip of metal employed in carrying out the invention is bent into the frusto-conical form with the contiguous edges slightly separated to permit of the contraction and expansion of the bushing respectively during the operations of locking and unlocking the nut, and one terminal of the bushing strip or blank has bent integrally therefrom an outturned retaining-tongue 7, extending transversely of the bushing from edge to edge thereof and adapted to slidably interlock with the groove 5 in the nut.

By reason of the frusto-conical shape of the locking-bushing 6 the same is formed with an exterior and interior taper; but to provide for the proper threading of the bushing on the bolt the interior of the bushing is tapped with threads 8 of varying depth, whereby the points at the bases of all of said threads 8 will lie within the same cylindrical plane, thus permitting the bushing to be freely run on and off of the threaded portion of the bolt when not wedged within the nut.

The locking-bushing 6 is of such a width that the inner end thereof cannot pass out of the bore of the nut at the inner side thereof. This provides for the inner side of the nut turning against the abutment of the object with which the bolt may be associated, as shown in Figs. 2 and 3 of the drawings, whereby the bushing is free to wedge as tightly within the nut as may be caused by the force applied to the wrench. At this point it will be further observed that by tapping the interior bushing with threads of varying depth the bushing will also firmly wedge itself upon the bolt when the nut is tightened, while the smooth exterior surface of the bushing has a similar wedging action within the tapered bore of the nut.

Ordinarily in applying the nut to the bolt the nut, with the bushing loosely placed therein, is freely run upon the threaded portion of the bolt until further movement of the nut is arrested by its engagement with the abutment or "resistance," as shown in Fig. 3 of the drawings. When the nut reaches this position, the locking-bushing projects slightly from the outer side thereof; but by a continued turning of the nut with a wrench or similar tool the bushing will be forcibly drawn into the bore of the nut and caused to tightly compress upon the thread of the bolt, as well as firmly wedge itself within the nut, thus providing a double locking action which positively prevents the nut from working loose by reason of the vibration to which it may be subjected.

Ordinarily this nut can be readily removed from the bolt by using a wrench. If, however, by long-continued use under extreme pressure the nut could not be turned off the bolt by a wrench, this result may be conveniently accomplished by means of a jam-nut, as explained in my former patent.

From the foregoing it is thought that the construction, operation, and the many advantages of the herein-described nut-lock will be readily apparent to those familiar with the art without further description, and it will be understood that various changes in the form, proportion, size, and the minor details of construction within the scope of the appended claims may be resorted to without departing from the principle or sacrificing any of the advantages of this invention.

Having thus described the invention, what is claimed, and desired to be secured by Letters Patent, is—

1. In a nut-lock, the combination with a bolt, of a nut having a threadless tapered bore and a frusto-conical resilient locking-bushing having a slidable interlocking engagement with the nut, said bushing being formed of a metal strip of the same thickness throughout, and provided in the inner inclined bore thereof with threads of varying depth whose bases lie in a common cylindrical plane.

2. In a nut-lock, the combination with a bolt, of a nut provided with a threadless tapered bore having in the wall thereof a transverse groove, and a frusto-conical resilient split locking-bushing provided at one terminal with an integral outturned tongue slidably interlocked with the groove, said bushing being formed of a metal strip of the same thickness throughout, and further provided within the inner inclined bore with threads of varying depth whose bases lie in a common cylindrical plane, substantially as described.

In testimony that I claim the foregoing as my own I have hereto affixed my signature in the presence of two witnesses.

DANIEL RHODES.

Witnesses:
JOHN H. SIGGERS,
HAROLD H. SIMMS.